United States Patent [19]

Kanoi et al.

[11] Patent Number: 5,760,492
[45] Date of Patent: Jun. 2, 1998

[54] CONTROL SYSTEM FOR POWER TRANSMISSION AND DISTRIBUTION SYSTEM

[75] Inventors: Minoru Kanoi, Toukai-mura; Yuzuru Imamura, Hitachi; Saburo Yasukawa, Hitachinaka; Masahiko Amano, Hitachioota; Shinji Tanifuji, Hitachi; Toshifumi Yoshikawa, Hitachi; Masahiro Watanabe, Hitachi, all of Japan

[73] Assignee: Hitachi, Ltd., Tokyo, Japan

[21] Appl. No.: 584,396

[22] Filed: Jan. 1, 1996

[30] Foreign Application Priority Data

Jan. 17, 1995 [JP] Japan .................................. 7-004670
Sep. 27, 1995 [JP] Japan .................................. 7-249077

[51] Int. Cl.$^6$ ............................................... H02J 9/06
[52] U.S. Cl. ............................... 307/18; 307/31; 364/492
[58] Field of Search ............................ 307/31, 32, 33, 307/34, 38, 39, 18; 364/492, 480

[56] References Cited

U.S. PATENT DOCUMENTS 4,475,047  10/1984  Ebert, Jr. .................................. 307/66
5,191,520  3/1993   Eckersley ................................. 363/72
5,574,653  11/1996  Coomer et al. ........................... 364/483

FOREIGN PATENT DOCUMENTS 6-276683  9/1994  Japan .

OTHER PUBLICATIONS

H. Akagi, "Trends in Active Power Line Conditioners", IEEE Transactions on Power Electronics, vol. 9, No. 3, May 1994, pp. 261–268.

"Semiconductor Power Convertor Circuit", Edited by Seimconductor Power Converting Method Investigating Committee for Japan Electrical Engineering Society. Published by Japan Electrical Engineering Society, 1987, (319 p. document—only front page, table of contents & Colophon of text attached).

Primary Examiner—William M. Shoop, Jr.
Assistant Examiner—Jonathan S. Kaplan
Attorney, Agent, or Firm—Fay,Sharpe,Beall,Fagan,Minnich & McKee

[57] ABSTRACT

In a control system for a power transmission and distribution system, a plurality of distributed power supplying and receiving units each including a control unit are provided and connected along a power distribution line. The power supplying and receiving unit function to generate active and reactive powers of fundamental and higher harmonic waves to supply and receive the same to and from the power distribution line. A first central control unit controls the power distribution line and is designed to store information relating to the configuration of the power distribution line, to collect information with regard to instant open and close conditions of respective disconnecting switches connected for sectioning the power distribution line, and with regard to current electrical quantities on the power distribution line. Individual control command signals specific to the respective power supplying and receiving units are produced based on the stored and collected information and the respective power supplying and receiving units are controlled so that a desired target condition of the power distribution line is achieved autonomously within the power distribution line through an optimum cooperation control of the units.

15 Claims, 12 Drawing Sheets

CONTROL SYSTEM FOR POWER TRANSMISSION AND DISTRIBUTION SYSTEM

BACKGROUND OF INVENTION

1. Field of the Invention

The present invention relates to a control system for a power transmission and distribution system and, in particular, relates to a control system for a power distribution system including a variety of loads and distributed power sources such as solar generators.

2. Conventional Art

In a power transmission and distribution system, a variety of efforts have been made for maintaining electrical power qualities such as optimum voltage level and suppressed higher harmonic waves. For example, in order to optimize the voltage level on the power transmission and distribution system a variety of tap controls are performed for transformers in respective substations of different voltage levels, voltage regulators, phase modifying devices and pole transformers. Further, recently many measures has been introduced which reduce momentary voltage drops and high harmonic waves on the power transmission and distribution system by making use of power use semiconductor elements having a high response performance as disclosed, for example, in "Semiconductor Power Convertor Circuits (Edited by Semiconductor Power Converting Method Investigating Committee for Japan Electrical Engineering Society, Published by Japan Electrical Engineering Society, 1987)".

Although many efforts have been made for maintaining the quality of electrical power on the power transmission and distribution system as explained above, the environment surrounding the power transmission and distribution system, in particular, the lower level power transmission and distribution system is significantly changing, in that the load difference between day and night, the system interconnection between distributed type power sources and power sources likely inducing higher harmonic waves are increasing, thereby the variation ranges of active power, reactive power and higher harmonic current which are generated from the lower level power transmission and distribution system are significantly increasing.

Therefore, it has become difficult to maintain the quality of electrical power through control of, for example, the voltage and the reactive power merely at a upper level power system controlling station as in the conventional manner.

For example, because of the increases in the load difference between day and night and in the system interconnection between a variety of distributed type power sources, the power flow directions vary in many ways and the voltage distribution over the power transmission and distribution system reaches increasing complexity, therefore the conventional measures such as changing locally the taps of the transformers and the pole transformers cannot always improve the voltage distribution over the entire power transmission and distribution system concerned. Further, at a lower level power transmission and distribution system many phase advancing capacitors are connected to optimize the voltage level during a heavy load condition, however, because of a significant phase advancing current induced by the phase advancing capacitors during a light load condition, the voltage level tends to rise toward a further lower level power transmission and distribution system and such voltage level rise can not always be prevented even if many reactors in an upper level power transmission and distribution system are closed.

Still further, recently higher harmonic waves are induced from many unspecified machines and apparatuses, thus the higher harmonic waves on the power transmission and distribution system, in particular on the power distribution system cannot sufficiently be reduced with a conventional measure which is designed to reduce the higher harmonic waves of specific machines and apparatuses and of specific portions of the system. In particular, since the system configuration of a power distribution system is frequency modified in response to, for example, the work thereon and the load distribution change thereover, the conventional measure which is designed to dispose control units therefor at specific portions cannot always meet such system configuration modification.

Moreover, the higher harmonic current induced by many power sources using semiconductor elements connected to a lower level power transmission and distribution system flows in a great quantity into the upper level power transmission and distribution system having a lower impedance to distort the voltage waveform in the upper power transmission and distribution system. As a result, many disturbances due to the higher harmonic waves are caused in lower level power transmission and disribution systems coupled to the concerned upper level power transmission and distribution system.

Conventionally, at an upper level power system monitoring and controlling station a control such as the voltage thereof has been performed based on an assumption that merely loads are connected to lower level power transmission and distribution systems. However, when many distributed type power sources are connected to a power transmission and distribution system as recently, the upper level power system monitoring and controlling station is required to perform the control in view of the power generation capacity of the many distributed type power sources which will put an almost unbearable control burden thereon.

SUMMARY OF THE INVENTION

An object of the present invention is to provide a control system for a power transmission and distribution system, in particular, for a power distribution system which resolves problems to which the recent power transmission and distribution system has encounted, in which the voltage level over the power transmission and distribution system is optimized and further in which, disturbances due to higher harmonic waves therethrough are suppressed. This permits a high effeciency operation thereof through limitation of a peak power flow by optimally sharing the loads into many distributed type power sources connected to the power transmission and distribution system concerned.

In the control system for a power transmission and distribution system according to the present invention, a plurality of power supplying and receiving units each including a control unit thereof are provided and connected distributedly along a power distribution line. Each power supplying and receiving unit functions to generates active and reactive powers of fundamental and of higher harmonic waves to supply and receive the same to and from the power distribution line. A first central control unit for controlling the power distribution line is designed to store information relating to the configuration of the power distribution line, to collect information with regard to instant open and close conditions of the respective disconnecting switches connected to the power distribution line for sectioning the same and with regard to current electrical quantities on the power distribution line, to produce individual control command signals specific to the respective power supplying and receiving units based on the stored and collected information and to transmit the same to the respective control units to control the respective corresponding power supplying and receiving units so that a desired target condition of the power distribution line is achieved autonomously within the power distribution line through an optimum cooperation control of the respective power supplying and receiving units.

Further, in the control system for a power transmission and distribution system according to the present invention, a second central control unit for controlling an upper level transmission line which is connected to the power distribution line via a step-down transformer is further provided. The second central control unit is designed to collect current electrical quantities at the step-down transformer through the first central control unit, to determine target conditions at the step-down transformer with reference to the collected current electrical quantities at the step-down transformer and to transmit the same to the first central control unit, whereby the first central control unit determines the desired target condition of the distribution line, compares the same with the current electrical quantities collected periodically and, if the deviation of the current electrical quantities from the target condition of the power distribution line concerned exceeds a predetermined allowable range, produces the individual control command signals which effect to reduce the deviation so that the desired target condition of the power distribution line is achieved autonomously within the power distribution line through an optimum cooperation control of the respective power supplying and receiving units.

BRIEF DISCRIPTION OF THE DRAWINGS

DETAILED DESCRIPTION OF PREFERRED EMBODIMENTS

Hereinbelow, an embodiment according to the present invention is explained with reference to FIG. 1 through FIG. 3.

Figure 1:
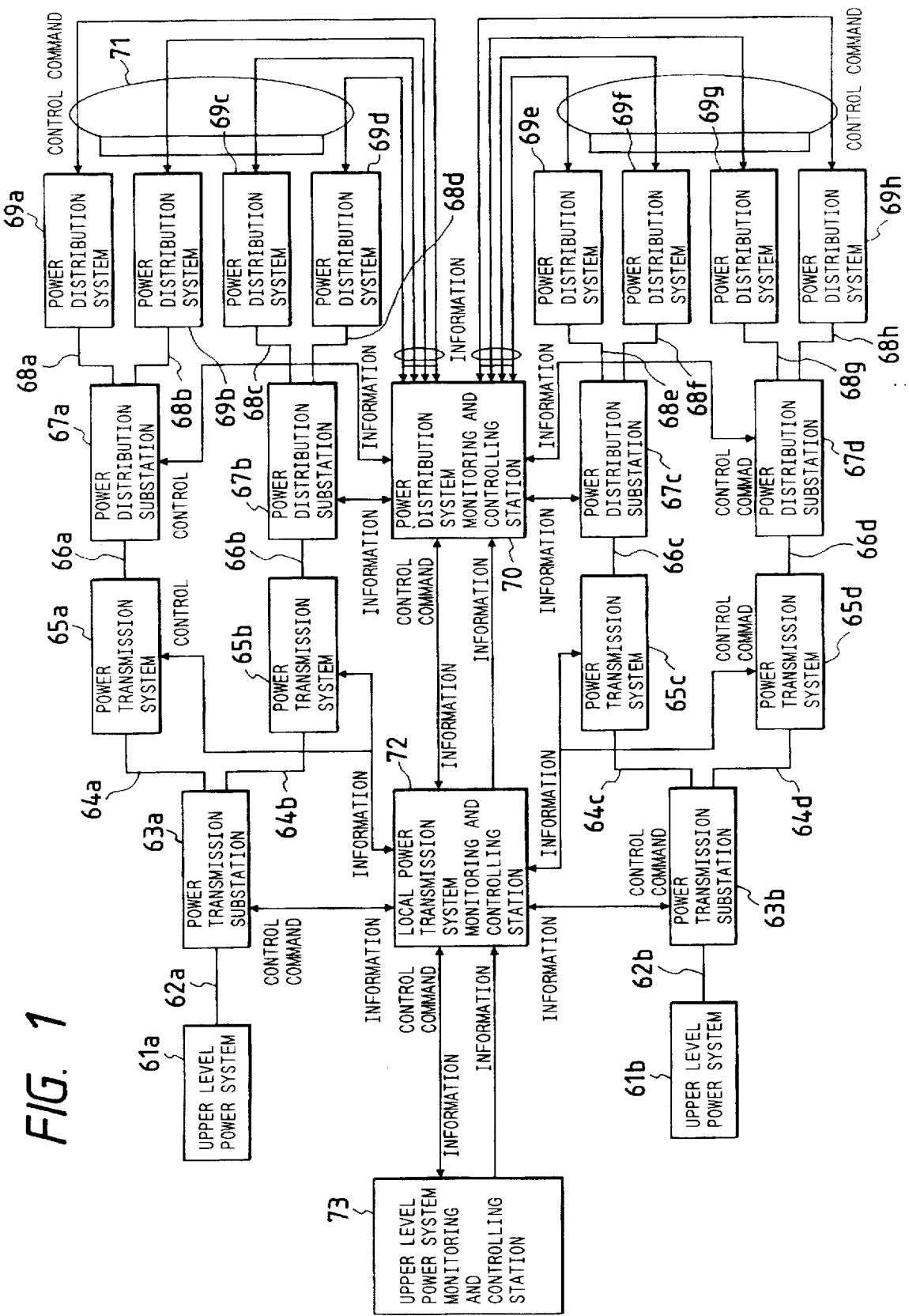
FIG. 1 is a block diagram showing a power transmission and distribution system to which the present invention is applied.

In FIG. 1, a power system connected to an upper level power system 61a is constituted by a power transmission substation 63a which is connected to the upper level power system via a transmission line 62a, power transmission systems 65a and 65b which are connected to the power transmission substation 63a via respective transmission lines 64a and 64b, power distribution substations 67a and 67b which are connected to the power transmission systems 65a and 65b via respective transmission lines 66a and 66b and power distribution systems 69a, 69b, 69c and 69d which are respectively connected to the power distribution substations 67a and 67b via respective distribution lines 68a, 68b, 68c and 68d. In the present specification, the expression "a power transmission and distribution line is connected to a substation" implies in practice that the power transmission and distribution line is connected to a power transformer (not shown) provided in the substation, which will be explained later. Since the same configuration as with the upper level power system 61a is employed for a power system connected to an upper level power system 61b, the explanation thereof is omitted. From the power distribution systems 69a, 69b, 69c and 69d information relating to the electrical quantities in the systems is transmitted and collected via communication lines 71 to a power distribution system monitoring and controlling station 70. Information from the power distribution substations 67a and 67b is transmitted and collected to the distribution system monitoring and controlling station 70. From the distribution system monitoring and controlling station 70 control commands are transmitted to respective power supplying and receiving control units (shown in FIG. 2) provided within the respective power distribution systems 69a, 69b, 69c and 69d via the communication lines 71. Further, control commands are also outputted from the distribution system monitoring and controlling station 70 to power supplying and receiving control units (shown in FIG. 2) provided in the power distribution substations 67a and 67b. Still further, from the distribution system monitoring and controlling station 70 information relating to electrical quantities such as active power, reactive power and higher harmonic current passing through a distribution use power transformer (shown in FIG. 2) provided respectively in the power distribution substations 67a and 67b is transmitted to a local power transmission system monitoring and controlling station 72. In the local power transmission system monitoring and controlling station 72 control commands for the power supplying and receiving control units (shown in FIG. 2) are prepared based on the information relating to the electrical quantities from the distribution system monitoring and controlling station 70, from the power transmission and distribution systems 65a and 65b and from the power transmission substation 63a, and are outputted to the power supplying and receiving control units provided within the power transmission systems 65a and 65b and the power transmission substation 63a. From the local power transmission system monitoring and controlling station 72 only information relating to electrical quantities such as active power, reactive power and higher harmonic currents passing through a power transformer (shown in FIG. 2) provided in the power transmission substation 63a is transmitted to an upper level power system monitoring and controlling station 73. The above explained operation can be applied to the electrical power system associated with the upper level power system 61b.

Figure 2:
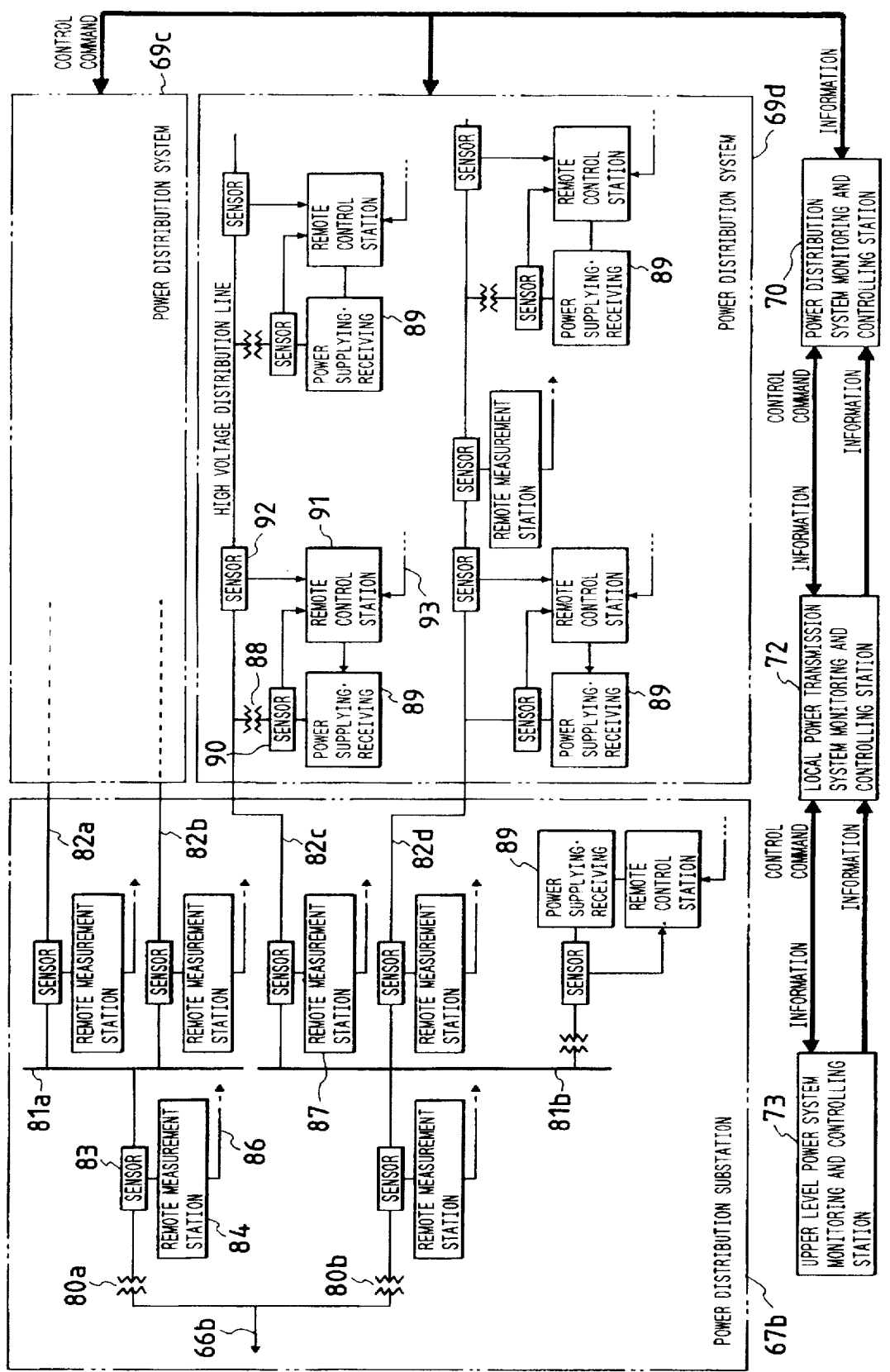
FIG. 2 is a block diagram of one embodiment of control systems for a power transmission and distribution system according to the present invention which is applied to the power transmission and distribution system shown in FIG. 1.
Figure 3:
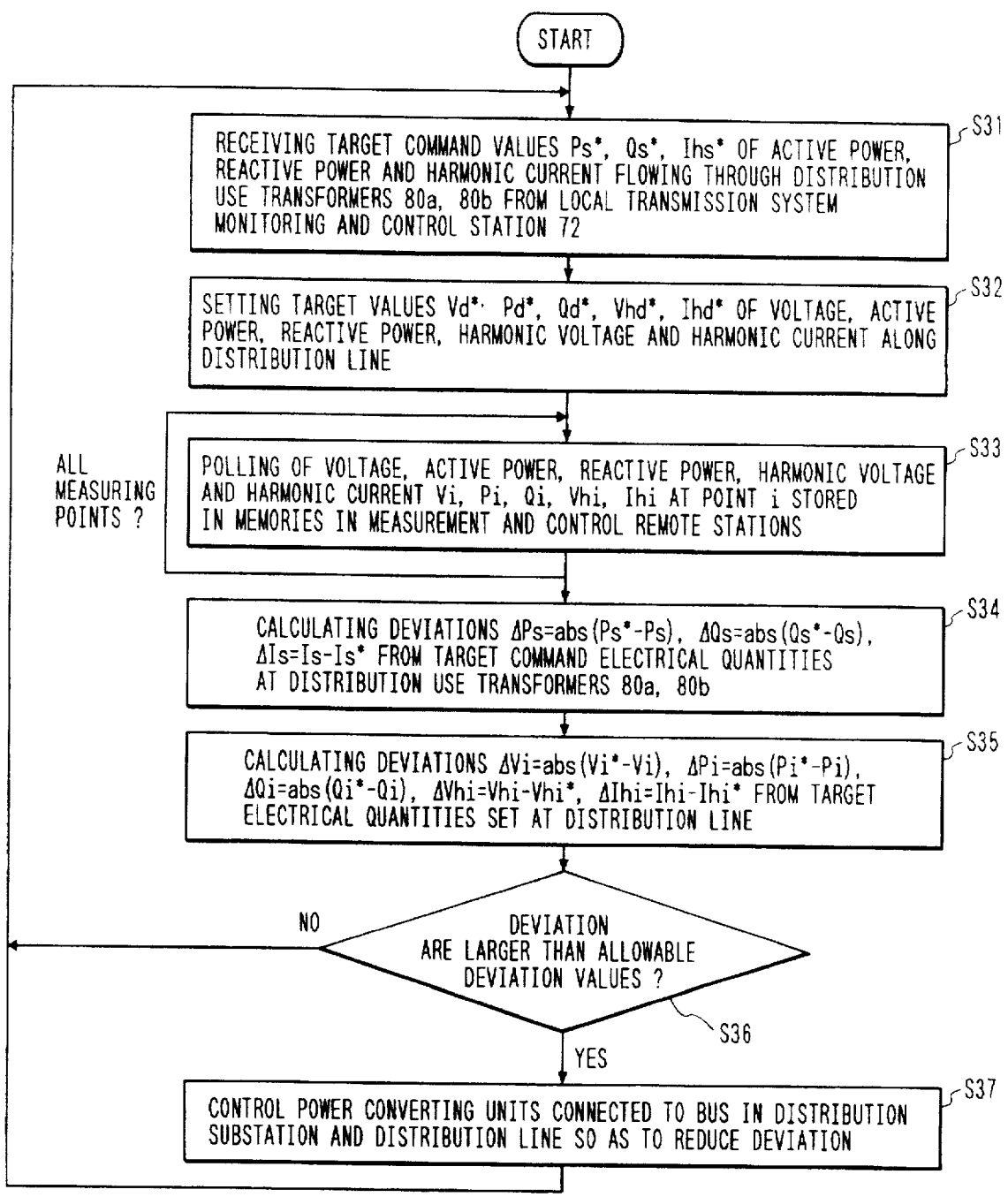
FIG. 3 is a flow chart for explaining the operation of the power distribution system monitoring and control station 70 in the embodiment shown in FIG. 2.

FIG. 2 shows a more specific constitution of the power distribution substation 67b and the power distribution systems 69c and 69d connected thereto in the above explained electrical power system construction, which is explained with reference to FIG. 2 as follows. In FIG. 2, distribution use power transformers 80a and 80b which are to be connected to the upper level power system 61a (shown in FIG. 2) via the transmission line 66b and the power transmission system 65b are provided in the power distribution substation 67b. To the distribution use power transformers 80a and 80b a plurality of distribution lines 82a, 82b, 82c and 82d are connected via buses 81a and 81b. Although the power transmission lines, buses and power distribution lines are generally constituted in three phases, in the drawings in the present specification such a three phase line is illustrated by a single line for simplifying the drawings. At the secondary side of the distribution use power transformer 80a a measurement device including a sensor 83 and a remote measurement station 84 which measures active power, reactive power and higher harmonic currents passing through the distribution use power transformer 80a is provided. The outputs from the remote measurement station 84 are transmitted to the distribution system monitoring and controlling station 70 via a communication line 86. The measurement of active power, reactive power and higher harmonic currents passing through the distribution use power transformer 80b is performed with the equivalent measuring means as above, therefore the explanation thereof is omitted. Considering the distribution line 82c as an example, the constitution of a distribution line according to the present embodiment is explained. At the leading out terminal of the distribution line 82c, a remote measurement station 87 is provided. To the distribution line 82c a plurality of power supplying and receiving units 89 are connected via respective output transformers 88. Herein, the power supplying and receiving unit 89 specifically implies an active and/or reactive electrical power generating unit making use of power use semiconductor elements, and including a secondary battery such as a capacitor namely represents a unit provided with a function which permits supplying and receiving active and reactive power of fundamental and higher harmonic waves to and from the distribution line 82c and of which output or input power to and from the distribution line 82c is designed to vary in a continuous manner from zero to maximum capacity of the unit. Between the distribution line 82c and the power suppliying and receiving unit 89 a sensor 90 which measures supplying and receiving power quantity is provided and the output thereof is tranmitted to a corresponding remote control station 91. To the remote control station 91 an output from a sensor 92 which measures the voltage, active and reactive power, higher harmonic voltage and current of the distribution line connected is transmitted and collected. The remote control station 91 is connected to the distribution system monitoring and control station 70 via a communication line 93 and transmits the collected information of these electrical quantities thereto. A device having a like constitution as above is also provided at other portions of the distribution line and at the bus line in the power distribution substation. Further, like sensors which measure the voltage, active and reactive power, and higher harmonic voltage and current on the distribution line are also provided at proper portions along the power distribution line. The sensors, for example, include a sensor which merely measures the voltage on the power distribution line.

The entire control operation of the distribution system monitoring and controlling station 70 for the above explained power transmission and distribution system is explained with reference to FIG. 3. In step S31, the distribution system monitoring and controlling station 70 receives target values Ps*, Qs* and Ihs* of active power, reactive power and higher harmonic current passing through the distribution use power transformer from the local power transmission system monitoring and controlling station 72. Among these target values, for example, the higher harmonic current is set so as to limit the voltage distortion in the local power transmission system within a few % and in view of a higher harmonic current which is permitted to flow out from the power distribution system 69d to the power transmission system 65b via the distribution use power transformer 80b. The target active power is set in view of leveling the load sharing and overloading protection of the power distribution line and the target reactive power is set in view of the phase modifying capacity of the upper level power transmission system including the power transmission line 65b and in view of the control easiness of the power system concerned. In step 32, target values Vd*, Pd*, Qd*, Vhd* and Ihd* of the voltage, active power, reactive power, higher harmonic voltage and higher harmonic current along the power distribution line are set. These targets values are also set in view of maintaining a good electrical power quality along the power distribution line concerned and of preventing overloading and load unbalancing between local areas. These target values can be varied along the distribution line concerned. In step S33, a polling of actual voltage, active power, reactive power, higher harmonic voltage and higher harmonic current Vi, Pi, Qi, Vhi and Ihi at point i is performed which were measured with the remote measurement stations 84 and 87 and the remote control stations 91, and such information is collected to the distribution system monitoring and controlling station 70. However, all of the above mentioned electrical quantities are not necessarily collected from all of the measurement points as indicated above and from some of the measurement points only the information relating to the voltage can be transmitted. In step S34, deviations of measured values Ps, Qs and Ihs of the active power, reactive power and higher harmonic current passing through the distribution use power transformers 80a and 80b from the target values Ps*, Qs* and Ihs* are calculated. The reason why the absolute deviations are calculated for the active power and the reactive power in the present embodiment is to suppress the active power and the reactive power passing through the distribution use power transformers 80a and 80b within a predetermined range. On the other hand, no absolute value is calculated for the higher harmonic current so as to suppress the same within a maximum limiting range. In step S35, deviations of the actual measured voltage, active power, reactive power, higher harmonic voltage and higher harmonic current Vi, Pi, Qi, Vhi and Ihi from the target values Vd*, Pd*, Qd*, Vhd* and Ihd* on the distribution line concerned are calculated. In S36, it is judged whether the deviations determined at steps S34 and S35 exceed predetermined deviations, and if one of the deviations exceeds the predetermined deviation the power supplying and receiving units connected respectively to the power distribution line and the bus line are controlled so as to reduce the actual deviation in step S37. An example of such controls is an empirical one, in that, to control gradually the power supplying and receiving quantity of the power supplying and receiving units in the order of the units having a higher sensitivity with regard to the deviation and if with such control the deviation as a whole moves to the reducing direction, the control is maintained. Further, when information with regard to deviations of which the respective power supplying and receiving units can improve for the power distribution line concerned is stored beforehand in the distribution system monitoring and controlling station 70 as the data base, optimum commands can be provided for the individual units. When it is judged in steps 36 that the deviation does not exceed the predetermined allowable deviation value, the step returns to step S31 and the above explained sequence is repeated in every predetermined time. Only the information relating to actual active power, reactive power and higher harmonic currents passing through the distribution use power transformers 80a and 80b is transmitted from the distribution system monitoring and controlling station 70 to the local power transmission system monitoring and controlling station 72. With the embodiment as explained above, the voltage, active power, reactive power, higher harmonic voltage and higher harmonic current over a power distribution system and the upper level power transmission system thereof are as a whole optimized. Further, the local power transmission system monitoring and controlling station 72 is only required to monitor the active power, reactive power and higher harmonic currents passing through the distribution use power transformers 80a and 80b which constitute junction points of the power transmission system 65b and the power distribution system 69c and 69d, therefore, the upper level monitoring and controlling station can simply deal the power distribution systems as loads of which active power, reactive power and higher harmonic currents are to be managed, accordingly, the burdens of the upper level monitoring and controlling station for the monitoring and controlling operation is reduced.

Still further, the voltage, active power, reactive power, higher harmonic voltage and higher harmonic current over the respective power distribution systems connected and associated with a power transmission system are optimized, therefore, disturbing effects for the associated power transmission system from the connected power distribution systems are eliminated.

Moreover, since the power which can be supplied or received by individual power supplying and receiving units can be limited depending on the conditions thereof, the distribution system monitoring and controlling station 70 can collect current suppliable and receivable power of the repective power supplying and receiving units and can reflect the current information in the cotrol so that a further accurate control of the power distribution system concerned can be realized because of the reflection of the current suppliable and receivable power of the respective power supplying and receiving units on the control.

Figure 4:
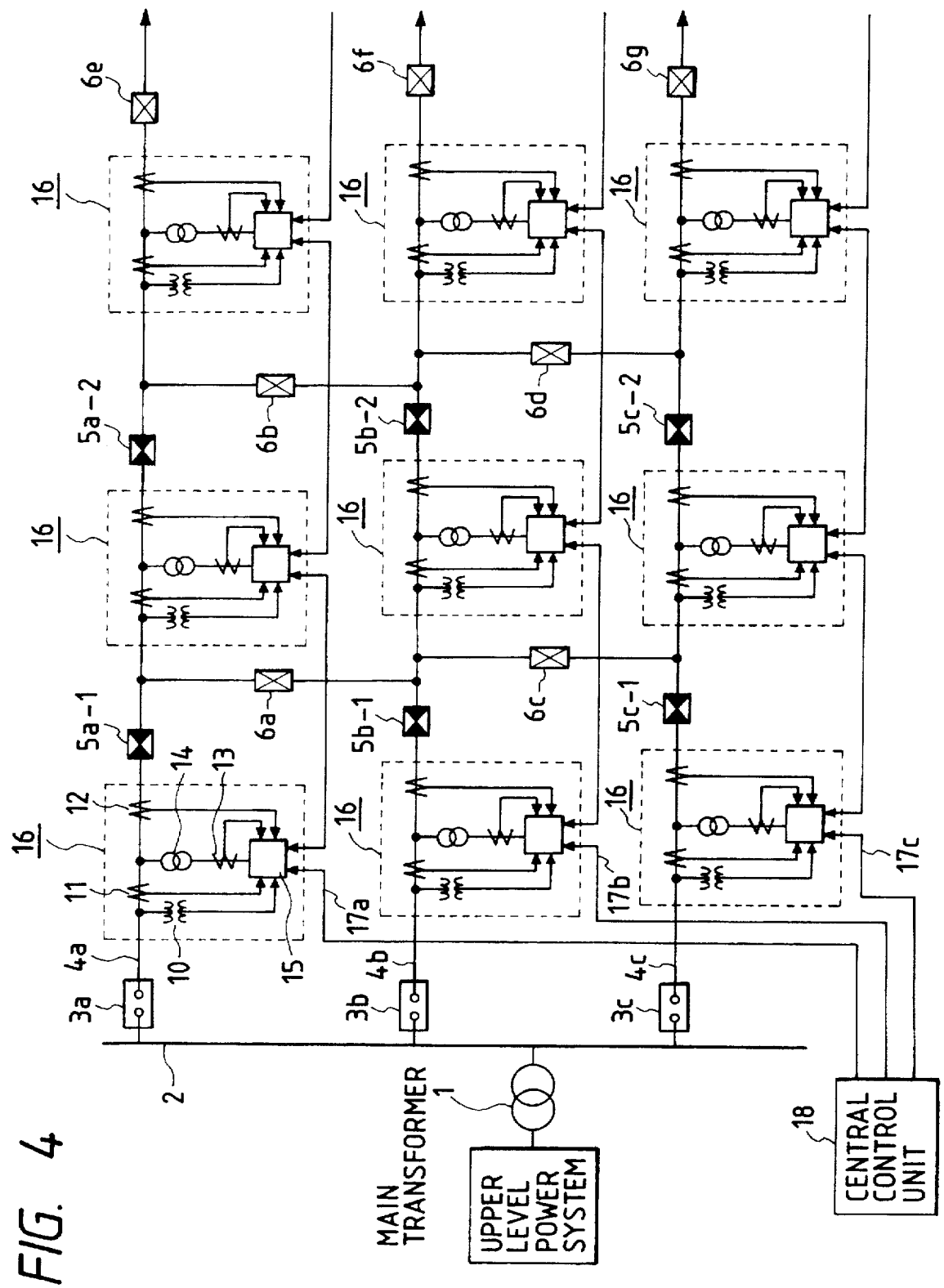
FIG. 4 is a block diagram of another embodiment of control systems for a power transmission and distribution system according to the present invention which is applied to the power transmission and distribution system shown in FIG. 1.

Hereinbelow, another embodiment according to the present invention is explained with reference to FIG. 4 through FIG. 9. In FIG. 4, a power distribution system is constituted by a main power transformer 1 which converts the supply voltage from an upper level power system into a distribution voltage and a plurality of distribution lines 4a, 4b and 4c connected to the main transformer 1 via a bus 2 and respective circuit breakers 3a, 3b and 3c. In the distribution lines 4a, 4b and 4c disconnecting switches 5a-1 through 5c-2 are respectively connected in series. Further, disconnecting switches 6a through 6g which interconnect the distribution lines 4a, 4b and 4c are also disposed.

Herein, the present embodiment is explained with reference to the distribution line 4a. To respective sections sectioned by the disconnecting switches 5a-1 and 5a-2 respective power supplying and receiving subsystems 16 are connected, each constituted by a line voltage sensor 10, a power source side current sensor 11, a load side current sensor 12, an output current sensor 13, an output transformer 14 and a power supplying and receiving unit 15. The respective power supplying and receiving units 15 are connected to the central control unit 18 via communication lines 17a, 17b and 17c.

Figure 5:
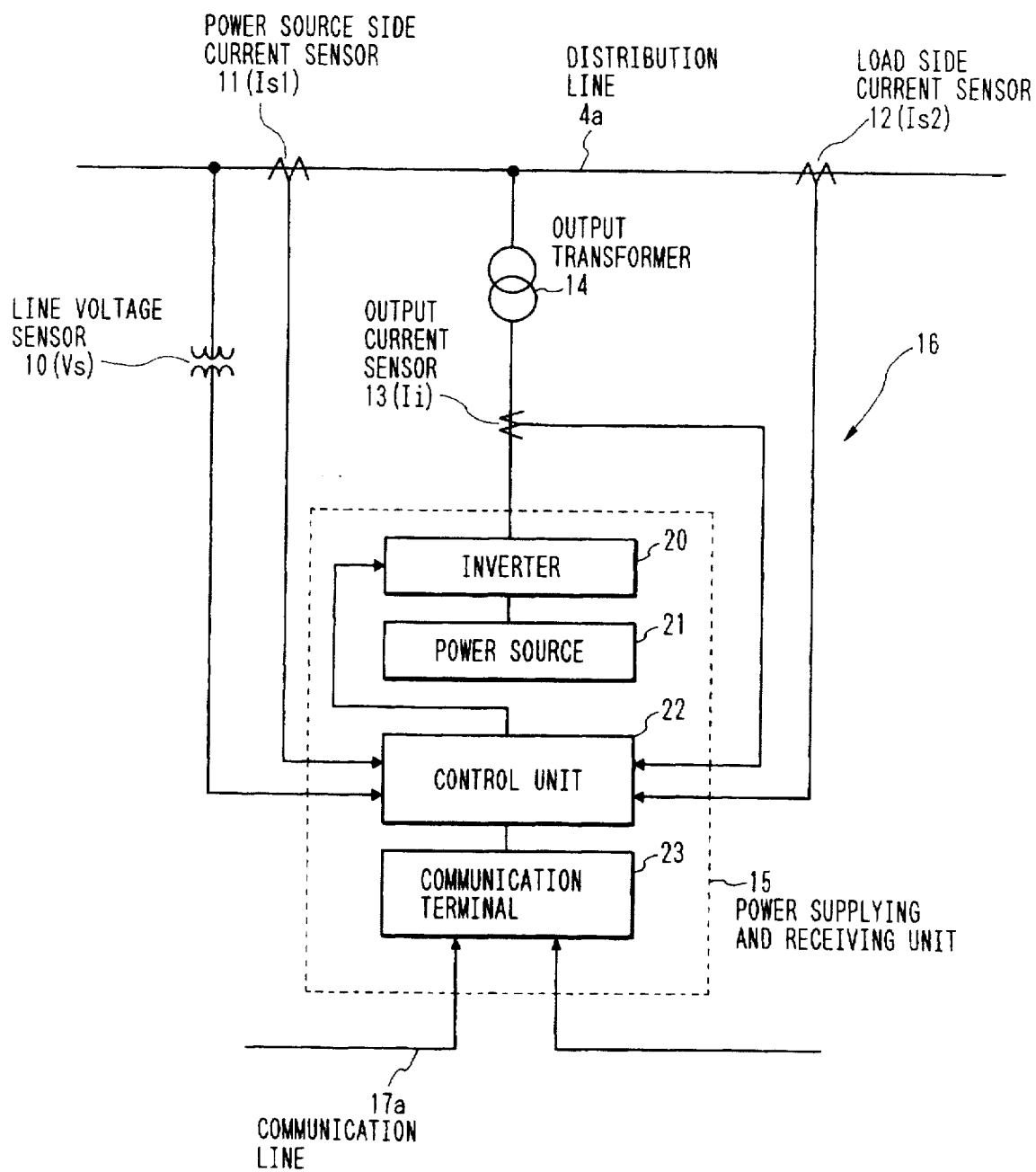
FIG. 5 is a block diagram showing an internal construction of the power supplying and receiving subsystem 16 in the embodiment shown in FIG. 4.

The internal structure of the power supplying and receiving unit 15 is explained with reference to FIG. 5. The power supplying and receiving unit 15 is constituted by an inverter 20 connected to the output transformer 14, a power source 21 such as a battery which supplies an electrical power to the inverter 20, a control unit 22 which controls the switching timing of the inverter 20 and a communication terminal 23 connected to the control unit 22. To the communication terminal 23 the communication line 17a is connected. To the control unit 22 outputs from the line voltage sensor 10, the power source side current sensor 11, the load side current sensor 12 and the output current sensor 13 are inputted. Vs, $Is_1$, $Is_2$ and Ii in FIG. 5 respectively indicate the outputs from the line voltage sensor 10, the power source side current sensor 11, the load side current sensor 12 and the output current sensor 13.

Figure 6:
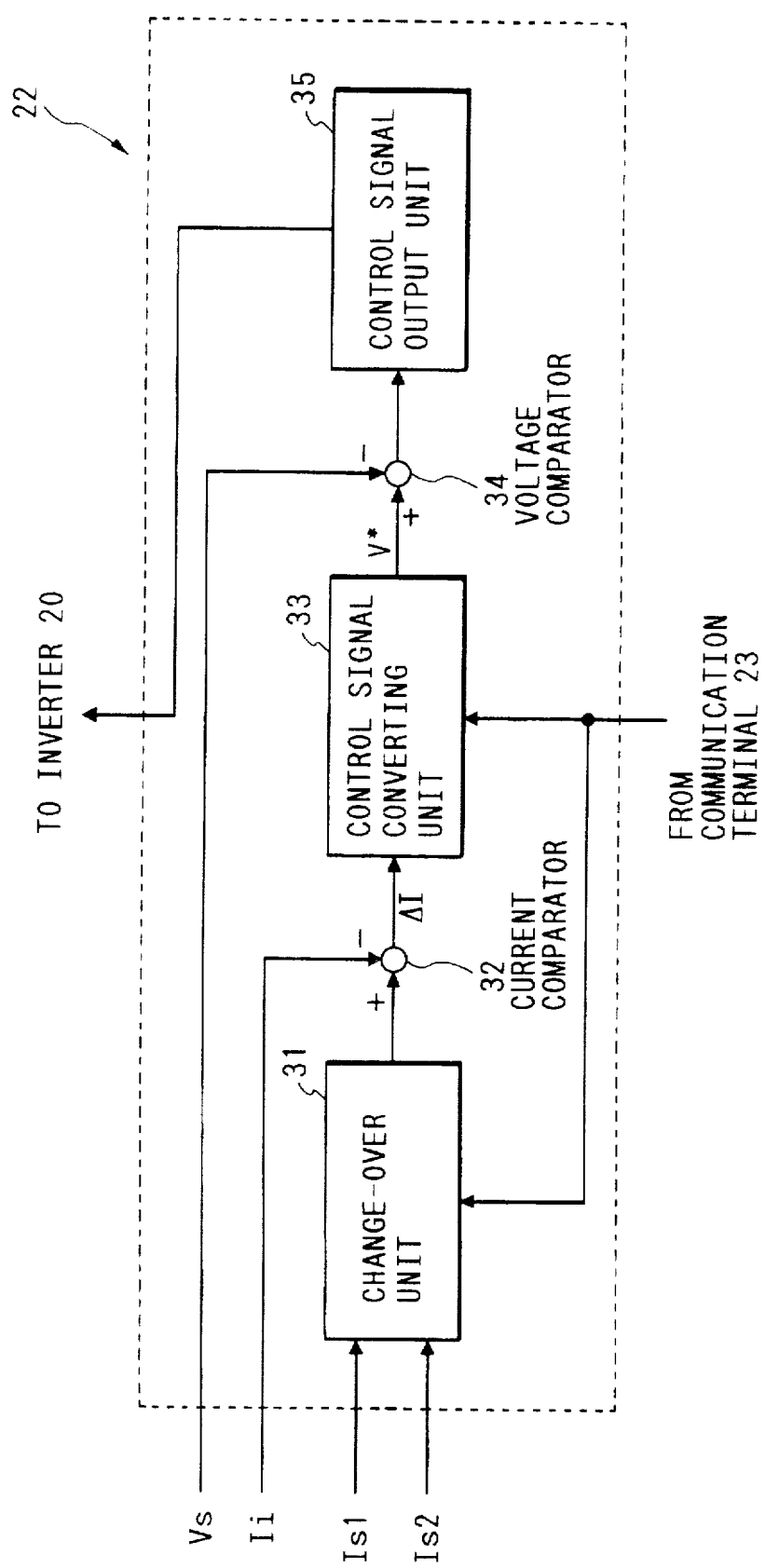
FIG. 6 is a block diagram showing an internal construction of the control unit 22 in the power supplying and receiving subsystem 16 shown in FIG. 5.

The internal structure of the control unit 22 is explained with reference to FIG. 6. The control unit 22 is constituted by a change-over unit 31 to which the output signals $Is_1$ and $Is_2$ from the power source side current sensor 11 and the load side current sensor 12 are inputted, a current comparator 32 in which the output signal from the change-over unit 31 and the output signal Ii from the output current sensor 13 are compared, a control signal converting unit 33 to which the compared output signal ΔI from the current comparator 32 is inputted, a voltage comparator 34 in which the output signal V* from the control signal converting unit 33 is compared with the output signal Vs from the line voltage sensor 10 and a control signal outputting unit 35 which produces an output signal for the inverter 20 based on the output signal from the voltage comparator 34.

Figure 7:
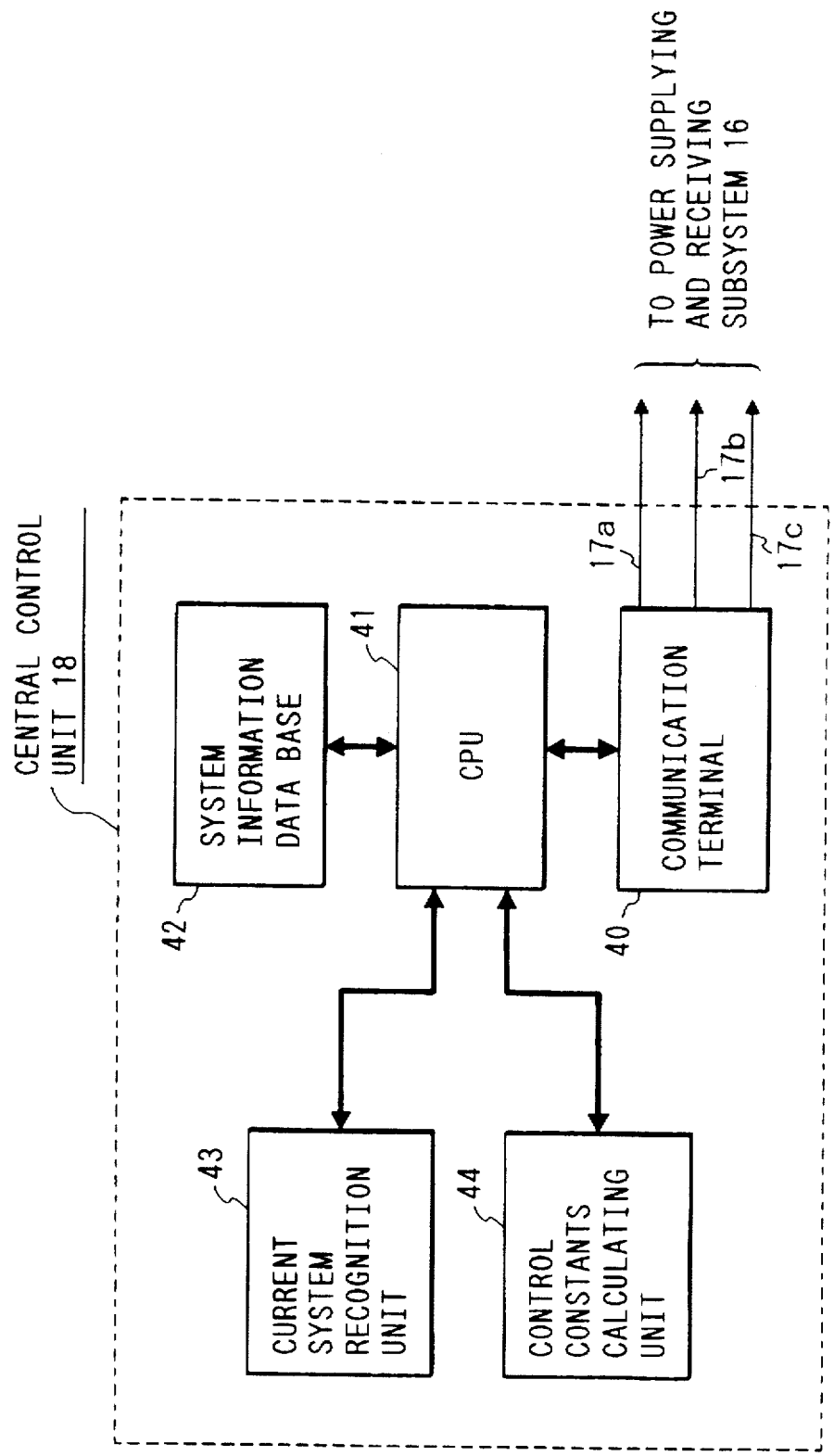
FIG. 7 is a block diagram showing an internal construction of the central control unit 18 in the embodiment shown in FIG. 4.

The structure of the central control unit 18 is explained with reference to FIG. 7. The central control unit 18 is constituted by a communication terminal 40 connected to the communication lines 17a, 17b and 17c, a CPU 41, a system information database 42 which is connected to the CPU 41 and is designed to store data such as the connecting relation of the system concerned and the system constants, a current system recognition unit 43 which is connected to the CPU 41 and is designed to recognize the current system configuration based on the information relating to the open and close conditions of the respective disconnecting switches which is collected separately via the communication terminal 40 and a control constants calculating unit 44 which is designed to calculate the control constants for the respective power supplying and receiving units 15 based on the information from the current system recognition unit 43.

Figure 8:
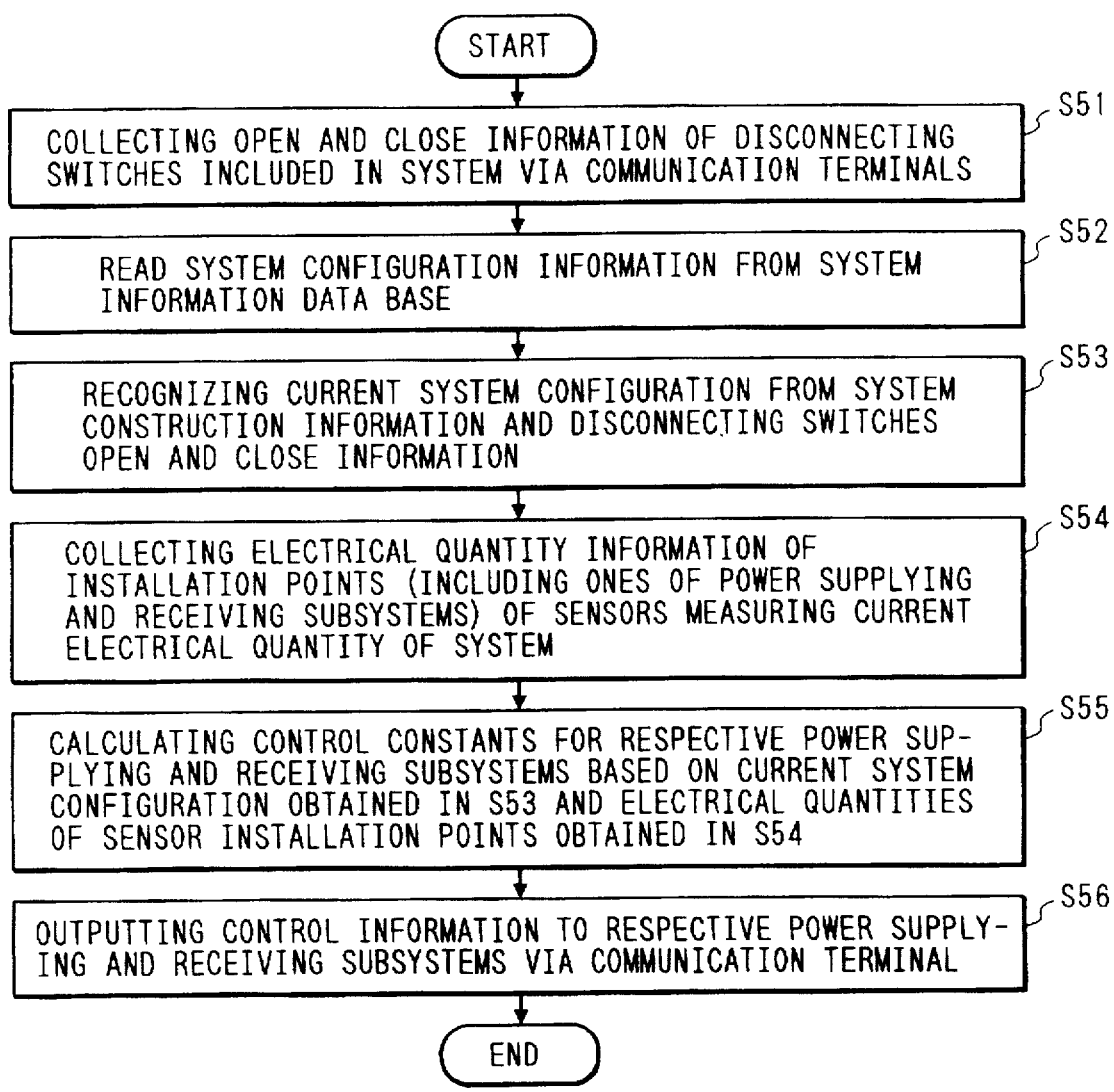
FIG. 8 is a flow chart for explaining the operation of the central control unit 18 as shown in FIG. 7.

The operation of the CPU 41 in the central control unit 18 in the thus constituted distribution line use power supplying and receiving control system is explained with reference to FIG. 8. In step S51, the information about the current open and close conditions of the respective disconnecting switches connected along the power distribution line system is collected via the communication terminal 40.

In step S52, the information about the system configuration, in particular, which distribution lines are connected to which distribution lines via which disconnecting switches, is read from the system information data base 42 in which no current information with regard to the open and close conditions of the respective disconnecting switches is contained. Therefore, in step S53 the current system configuration is recognized based on the system configuration information obtained in step S52 and the current open and close condition of the respective disconnecting switches obtained in S51. In step S54, information with regard to electrical quantities such as voltage and current from the installation points of sensors which measure the current electrical quantities is collected. In the present embodiment such sensors are installed at points (not shown) on the power distribution system which will represent typical electrical conditions of the system other than the installation points of the respective power supplying and receiving subsystems 16. In step S55, the control constants for the respective power supplying and receiving subsystems 16 are calculated based on the current system configuration obtained in step S53 and the information of the electrical quantities at the respective sensor installation points on the system obtained in step S54. In the present embodiment, the control constants are set so that the respective power supplying and receiving subsystems 16 installed at respective distributed points operate in cooperation. For example, with regard to a higher harmonic wave suppression if no cooperation control operation is performed as in a conventional system only a power supplying and receiving subsystem near the higher harmonic wave generating source performs a full higher harmonic wave suppressing operation and the other power supplying and receiving subsystems perform insufficient higher harmonic wave suppressing operation so that a large burden of the higher harmonic wave suppressing operation is incurred on a specific power supplying and receiving subsystem. Further, with regard to voltage distribution optimization over the system if no cooperation control operation is performed, an opposite control operation of the voltage may happen in the power distribution system. Namely, the respective power supplying and receiving subsystems may perform inconsistent operation for modifying the voltage over the power distribution system, in that one power supplying and receiving subsystem may operate to rise the voltage of the power distribution system, on the other hand another power supplying and receiving subsystem may operate to lower the voltage of the power distribution system. In the present embodiment, in order to prevent the above explained undesirable operation of the respective power supplying and receiving subsystems, the control constants are calculated, for example, with which speeds and gains of the respective power supplying and receiving subsystems are to be controlled in relation to the other power supplying and receiving subsystems based on the recognition of the installed positional relationship of the respective power supplying and receiving subsystems in the power distribution system whether a certain power supplying and receiving subsystem is installed near or remote from the power source side and based on the determination with regard to the electrical quantities on the power distribution system whether a certain power supplying and receiving subsystem is installed at a point showing a large higher harmonic current. In step S56, these calculated control constants are transmitted to the respective power supplying and receiving subsystems 16 via the comunication terminal 40 and the communication lines 17a, 17b and 17c.

As an alternative of the present embodiment, the specific communication lines 17a, 17b and 17c need not to be used. Instead thereof, through a use of a synchronous transmission method in a power distribution system as disclosed in JP-B-6-24328(1994), the communication between the central control unit 18 and the respective power supplying and receiving subsystems 16 can be performed by making use of the power distribution lines themselves as the control signal transmission medium.

Figure 9:
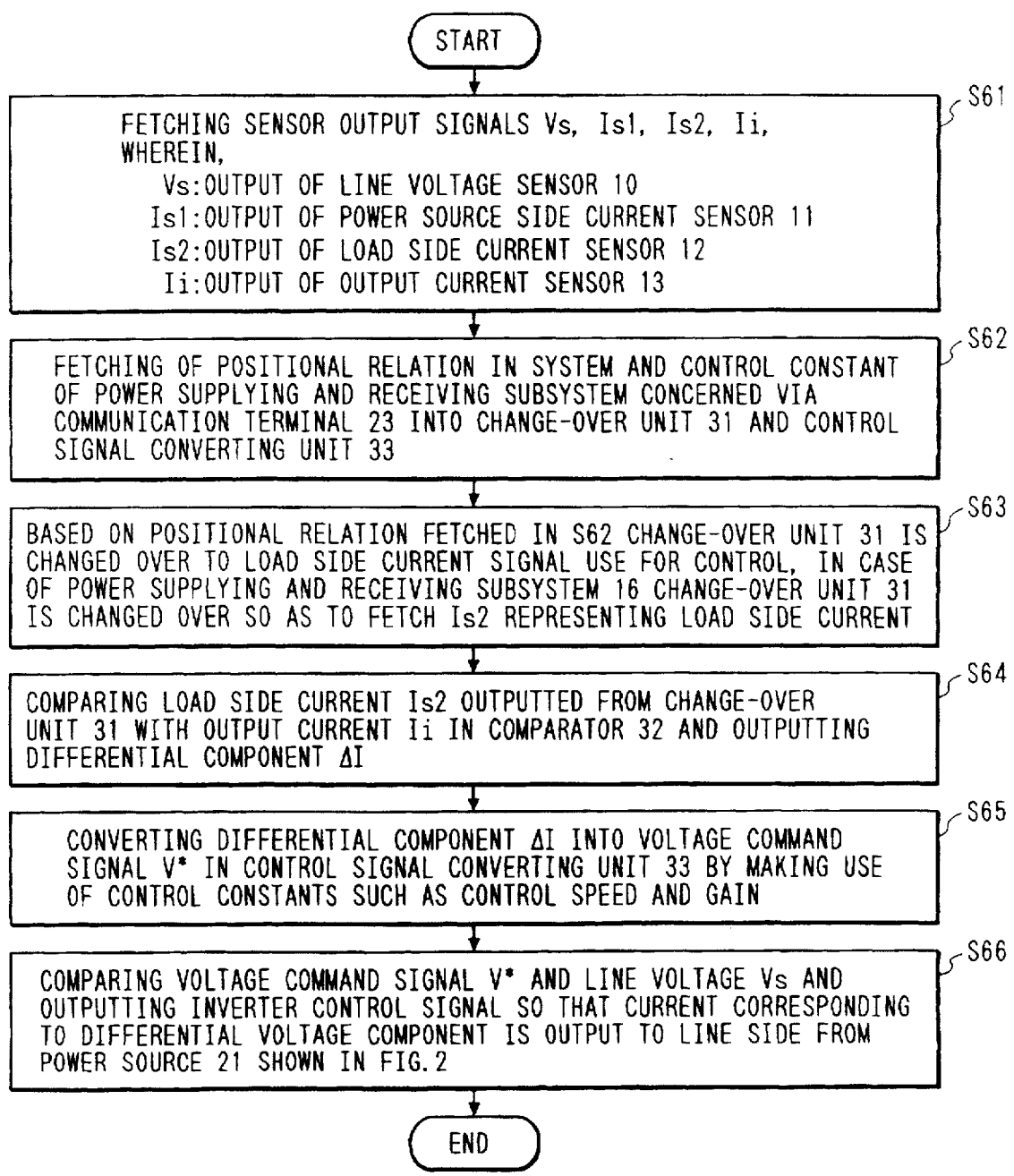
FIG. 9 is a flow chart for explaining the operation of the control unit 22 as shown in FIG. 6.

The control operation of the control units 22 for the respective power supplying and receiving subsystems 16 is explained with reference to FIG. 6 and FIG. 9. In step S61, the sensor output signals Vs, $Is_1$, $Is_2$ and Ii are fetched. In step S62, the positional relationship on the power distribution system of the respective power supplying and receiving subsystems 16 concerned and the control constants for the respective power supplying and receiving subsystems concerned are respectively fetched into the change-over unit 31 and the control signal conventing unit 33 via the communication terminal 23. In steps 563, the switch of the change-over unit 31 is changed-over toward the load side current signal used for control based on the positional information of the power supplying and receiving subsystem concerned which was fetched in steps 562. The reason why the load side current information is used instead of the power source side current information is that the current outputted from a power supplying and receiving subsystem generally flows out toward the power source side so that the control is comparatively simplified if the load side curent information is used which is comparatively unaffected by the output of the power supplying and receiving subsystem. In order to judge which side of the distribution line with respect to the power supplying and receiving subsystem connected thereto is the load side, the central control unit 18 which judges the conditions of the upper level power transmission system and the open and close conditions of the respective disconnecting switches judges power flow direction at the point where the power supplying and receiving subsystem 16 concerned is connected, and transmits the judged power flow direction to the control unit 22 via the communication lines 17a, 17b and 17c and the communication terminal 23. Thereafter the control unit 22 judges which current $Is_1$ or $Is_2$ is to be used as the load side current with reference to the transmitted power flow direction.

In the illustrated present embodiment, since the current $Is_2$ is the load side current, the switch of the change-over unit 31 is changed-over so as to fetch the current $Is_2$. In step S64, the output from the change-over unit 31 representing the load side current $Is_2$ and the output current Ii are compared in the current comparator 32 and the differential component ΔI thereof is outputted therefrom. In step S65, the differential component ΔI is converted into a voltage command signal V* by making use of the control constants such as control speed and control gain which are fetched into the control signal converting unit 33. In step S66, the voltage command signal V* and the line voltage Vs are compared in the voltage comparator 34 and an inverter control signal is outputted from the control signal output unit 35 to the inverter 20 so that the current Ii corresponding to the differential voltage component ΔV is outputted from the power source 21 shown in FIG. 5 toward the distribution line while keeping a control cooperation with the other power supplying and receiving subsystems. Thereby, the switching timing of the inverter 20 is varied while keeping an overall control cooperation with regard to the control constants of the respective power supplying and receiving subsystems and the current supplied from the power source 21 to the distribution line concerned is regulated in a variety of ways. As a result, the possible overload elimination, the voltage optimization and the higher harmonic wave suppression by means of opposite phase output currents are achieved over the entire power distribution system.

In the present embodiment, a control which makes use of the load side current is explained, however when the current outputted from a power supplying and receiving subsystem concerned flows out dividedly into the power source side and the load side depending on the system parameters concerned, the power source side current can be used in conjunction with the load side current to thereby increase the control accuracy.

Figure 10:
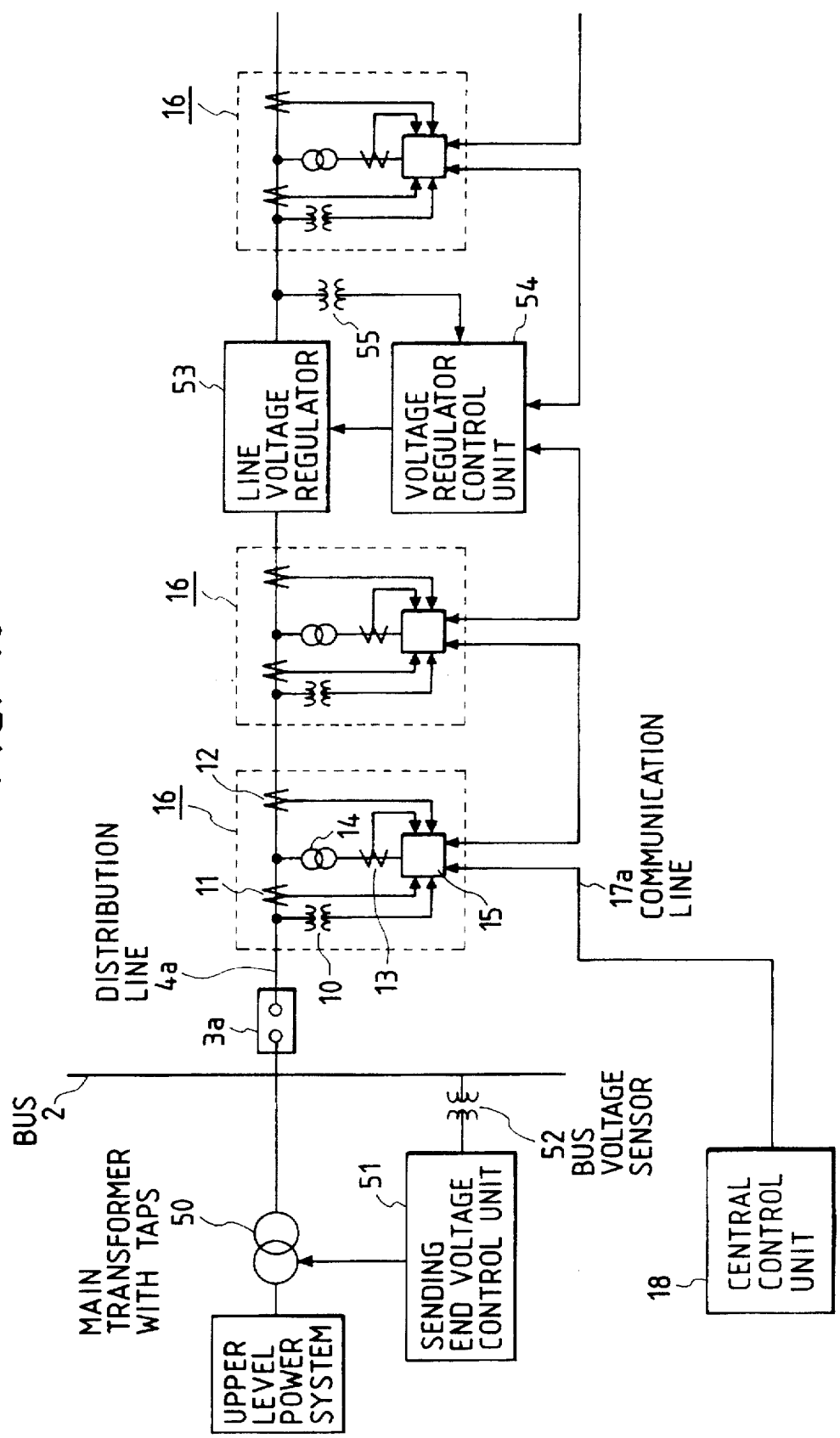
FIG. 10 is a block diagram of still another embodiment of control systems for a power transmission and distribution system according to the present invention which is applied to the power transmission and distribution system shown in FIG. 1.
Figure 11:
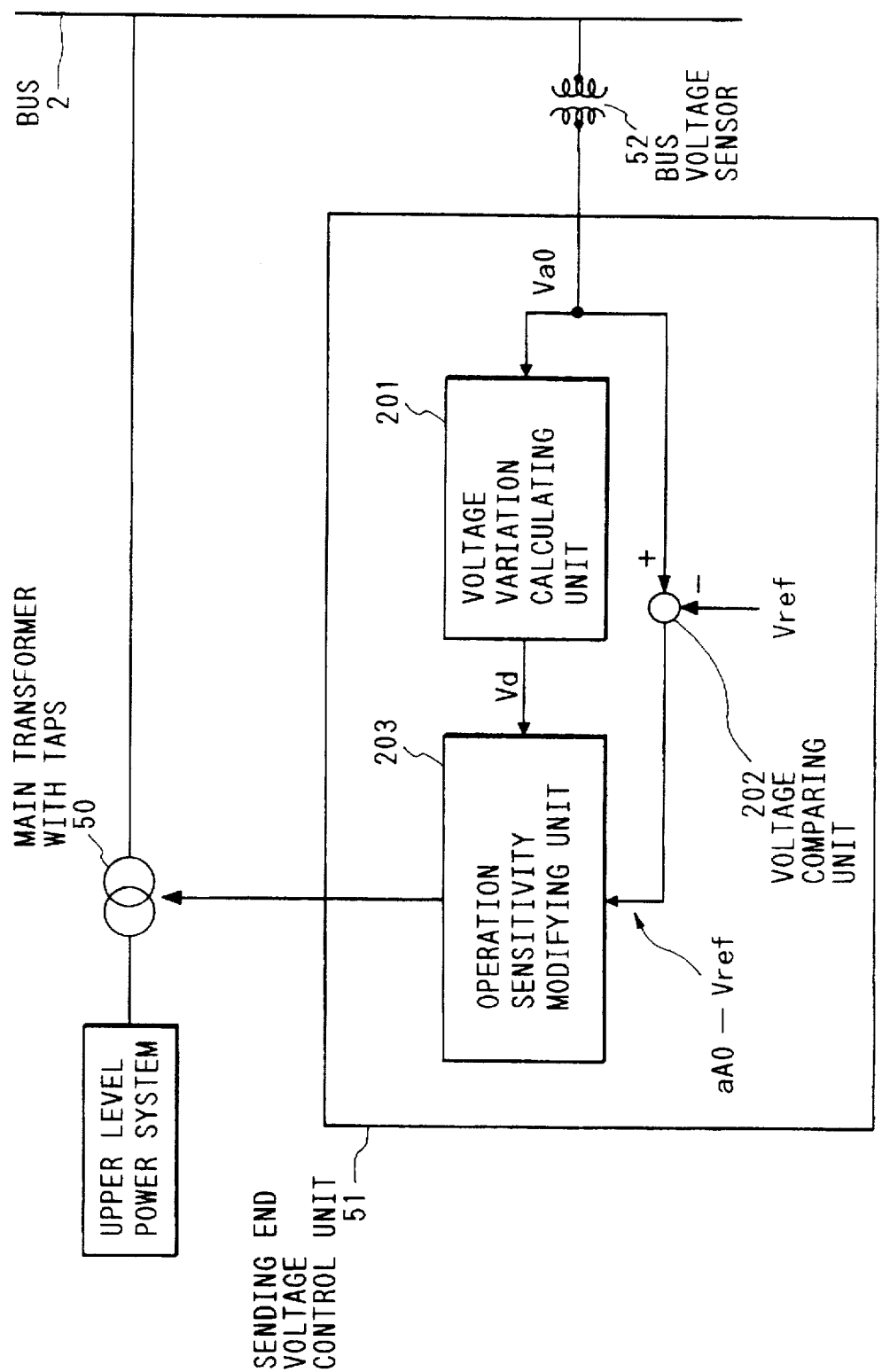
FIG. 11 is a block diagram showing an internal construction of the sending end voltage control unit 51 in the embodiment shown in FIG. 10.
Figure 12:
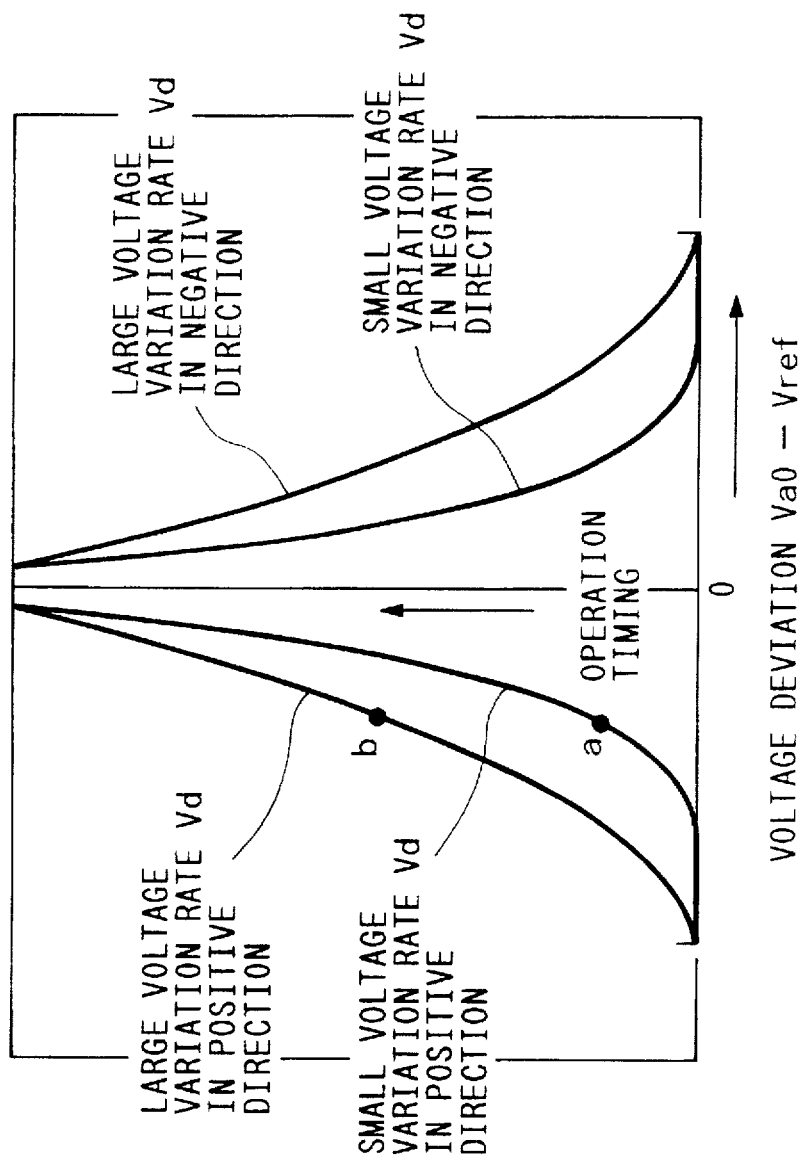
FIG. 12 is a diagram showing an example of sensitivity characteristic curves of the operation sensitivity modifying unit 203 shown in FIG. 11.

Still another embodiment according to the present invention is explained with reference to FIG. 10 through FIG. 12. In FIG. 10, the equivalent elements as in in FIG. 4 are designated by the same reference numerals and the explanation thereof is omitted. The main power transformer 50 is provided with a voltage tap changer unit (not shown) which steps-up or steps-down the secondary voltage thereof and further a sending end voltage control unit 51 for controlling the voltage tap changer unit is connected to the main power transformer 50. A bus voltage sensor 52 is connected to the bus 2, and the output from the bus voltage sensor 52 is transmitted to the sending end voltage control unit 51 as an input therefor. Along the distribution line 4a a plurality of power supplying and receiving subsystems 16 are connected in parallel and a line voltage regulator 53 is connected in series. The junction points of the respective power supplying and receiving subsystems are selected at proper points which will optimize voltage distribution over the power distribution system, for example, at or near the crest (local maximum or trough (local minimum) of the voltage distribution over the power distribution system concerned, in view of, for example, the system configuration, line parameter distribution, load distribution and voltage distribution when the system configuration is varied. A voltage regulator control unit 54 is connected to the voltage regulator 53. To the voltage regulator control unit 54 a voltage signal at the installation point of the line voltage regulator 53 is inputted from a line voltage sensor 55 measuring the same. The respective power supplying and receiving subsystems. 16 and the voltage regulator control unit 54 are respectively connected to the central control unit 18 via the communication line 17a. In the present embodiment, the line voltage sensor 10, 55 are disposed at the installation points of the power supplying and receiving subsystems 16 and the line voltage regulator 52, however, the location of the voltage sensors 10, 55 is not limited to the installation positions of the power supplying and receiving subsystems 16 and the line voltage regulator 52, and the number of the voltage sensors and the locations thereof are determined in such a manner which permits to determine a voltage profile over the overall power distribution system concerned while in addition making use of an estimation measure.

The operation of the present embodiment is explained with reference to FIGS. 10 through 12. Since the power supplying and receiving subsystem 16 is generally formed by making use of power semiconductor elements, it is possible to quickly bring the voltage to be regulated to a target voltage. On the other hand, the response by the voltage regulation with the main power transformer 50 with taps and the line voltage regulator 53 is slow because of the use of the mechanical taps. Therefore, after performing an operation by the power supplying and receiving subsystems 16 in the direction to raise the system voltage, the main power transformer 50 and/or the line voltage regulator 53 may lately perform an opposite useless operation which works to lower the system voltage. In the present embodiment, such problem is resolved by providing an operation sensitivity modifying unit in the sending end voltage control unit 51 and/or the voltage regulator control unit 54. The sending end voltage control unit 51 including the operation sensitivity modifying unit is exemplarily explained with reference to FIG. 11. The sending end voltage control unit 51 is constituted by a voltage variation calculating unit 201, a voltage comparing unit 202 and an operation sensitivity modifying unit 203. An output Vao from the bus voltage sensor 52 is inputted to the voltage variation calculating unit 201 as well as is compared with a target voltage Vref at the voltage comparing unit 202. The outputs from the voltage variation calculating unit 201 and the voltage comparing unit 202 are inputted into the operation sensitivity modifying unit 203. The output of the operation sensitivity modifying unit 203 is inputted to the main power transformer 50 with taps. In the operation sensitivity modifying unit 203, a time interval until the voltage taps of the main power transformer initiate a tap changing operation (hereinbelow called as voltage tap changing operation initiating time) is set in accordance with the sensitivity curves as shown in FIG. 12 based on the input from the voltage comparing unit 202, namely a voltage deviation Vao–Vref from the reference voltage, and the input Vd from the voltage variation calculating unit 201. As illustrated in FIG. 12, for example, even in cases of points a and b having substantially the same negative voltage deviations, different voltage tap changing operation initiating times are set depending on the difference of the voltage variation rates Vd. The points a and b correspond to conditions where the input bus voltage Vao is smaller than the reference voltage Vref so that the sending end voltage control unit 51 operates to increase the output bus voltage Vao by shifting the taps in the direction of raising the voltage thereof. However, in case of the point b having a larger voltage variation rate Vd in positive direction, it is judged that the respective power supplying and receiving subsystems connected to the power distribution system concerned have already performed operations in the direction of raising the system voltage, the voltage tap changing operation initiation time is delayed or an insensitive band for the operation sensitivity modifying unit 203 is enlarged. Thereby, the opposite useless voltage tap changing operation of the main power transformer 50 with taps and the line voltage regulator 53 during or after the voltage raising operation by the power supplying and receiving subsystems is prevented.

In the present embodiment, only the sending end voltage control unit 51 including the operation sensitivity modifying unit 203 is exemplary explained, however the voltage regulator control unit 54 likely includes the operation sensitivity modifying unit and operates in the same manner as in the sending end voltage control unit 51 of which detail explanation is omitted for avoiding repetition.

We claim:

1. A control system for a power transmission and distribution system comprising, a power transmission line;

a distribution use transformer connected to said power transmission line;

a power distribution line connected to said distribution use transformer;

a plurality of disconnecting switches sectioning said power distribution line;

a plurality of power supplying and receiving units each including a control unit connected distributedly along said power distribution line;

a first central control unit for controlling said power distribution line, wherein said first central control unit stores information relating to configuration of said power distribution line, collects information with regard to current open and close conditions of said respective disconnecting switches and with regard to current electrical quantities of said power distribution line at least at said power supplying and receiving units, produces individual control command signals specific to said respective power supplying and receiving units based on the stored and collected information and transmits the produced individual control command signals to respective said control units to control said respective corresponding power supplying and receiving units so that a target condition of said power distribution line is achieved autonomously within said power distribution line through an optimum cooperation control of said respective power supplying and receiving units.

2. A control system for a power transmission and distribution system according to claim 1, further comprising, a second central control unit for controlling said power transmission line, said second central control unit collects current electrical quantities at said distribution use transformer through said first central control unit, determines target conditions at said distribution use transformer with reference to the collected current electrical quantities at said distribution use transformer and transmits the determined target conditions at said distribution use transformer to said first central control unit, wherein said first central control unit determines the target condition of said power distribution line with reference to the target conditions at said distribution use transformer, compares the determined target condition of said power distribution line with the current electrical quantities and, if the deviation of the current electrical quantities from the target condition of said power distribution line exceeds a predetermined allowable range, produces the individual control command signals which are effective to reduce the deviation.

3. A control system for a power transmission and distribution system according to claim 1, wherein said power supplying and receiving unit is a type of which an output or input power to and from said power distribution line is designed to be variable in a continuous manner from zero to maximum capacity.

4. A control system for a power transmission and distribution system according to claim 2, wherein said power supplying and receiving unit is a type of which an output or input power to and from said power distribution line is designed to be variable in a continuous manner from zero to maximum capacity.

5. A control system for a power transmission and distribution system according to claim 3, wherein said power supplying and receiving unit is composed by an inverter and a secondary battery connected to said inverter.

6. A control system for a power transmission and distribution system according to claim 1, wherein said first central control unit determines power flow directions at respective points on the power distribution line where the respective power supplying and receiving units are connected and transmits the determined power flow directions to said respective control units of said power supplying and receiving units, wherein said respective control units receive two current signals from both sides of the respective points where the respective power supplying and receiving units are connected, determine which current represents one at the load side for said respective power supplying and receiving units with reference to the power flow directions received from said first central control unit and produce respective control signals for said respective corresponding power supplying and receiving units by making use of the respective currents at the load side thereof.

7. A control system for a power transmission and distribution system according to claim 1, wherein said respective power supplying and receiving units are distributedly connected at points on said power distribution line where a voltage distribution over the power transmission and distribution system is at either a local maximum or a local minimum.

8. A control system for a power transmission and distribution system according to claim 1, wherein said respective power supplying and receiving units are distributedly connected at points on said power distribution line where higher harmonic current is comparatively frequently generated.

9. A control system for power transmission and distribution system according to claim 1, wherein the target condition of said power distribution line is a voltage level having a predetermined allowable range.

10. A control system for power transmission and distribution system according to claim 1, wherein the target condition of said power distribution line is a predetermined voltage distribution pattern along said power distribution line.

11. A control system for a power transmission and distribution system according to claim 1, wherein said distribution use transformer is a distribution use transformer with a tap changer, and further comprises a sending end voltage control unit for controlling said distribution use transformer with the tap changer, said sending end voltage control unit including an operation sensitivity modifying unit which modifies the operation sensitivity of the tap changer in said distribution use transformer depending on the voltage variation rate at the secondary side of said distribution use transformer.

12. A control system for a power transmission and distribution system according to claim 11, further comprises a voltage regulator connected to said power distribution line and a voltage regulator control unit therefor including an operation sensitivity modifying unit for modifying the operation sensitivity of said voltage regulator depending on the voltage variation rate at the connecting point of said voltage regulator on said power distribution line.

13. A control system for a power transmission and distribution system according to claim 1, further comprises a voltage regulator connected to said power distribution line and a voltage regulator control unit therefor including an operation sensitivity modifying unit for modifying the operation sensitivity of said voltage regulator depending on the voltage variation rate at the connecting point of said voltage regulator on said power distribution line.

14. A control system for a power transmission and distribution system according to claim 1, wherein said first central control unit collects information with regard to current suppliable and receivable electrical power of said respective power supplying and receiving units of which information is taken into account for producing the individual control command signal specific to said respective power supplying and receiving units.

15. A control system for a power transmission and distribution system according to claim 1, wherein the individual control command signals specific to said respective power supplying and receiving units are control constants including control speed and control gain for said respective power supplying and receiving units.

* * * * *

UNITED STATES PATENT AND TRADEMARK OFFICE
CERTIFICATE OF CORRECTION

PATENT NO. : 5,760,492
DATED      : June 2, 1998
INVENTOR(S) : M. KANOI et al

It is certified that error appears in the above-indentified patent and that said Letters Patent is hereby corrected as shown below:

On the title page, item [22], change

"January 1, 1996" to --January 11, 1996--.

Signed and Sealed this

Twenty-fifth Day of August, 1998

*Attest:*

BRUCE LEHMAN

*Attesting Officer*    *Commissioner of Patents and Trademarks*